United States Patent [19]
Kawaguchi et al.

[11] Patent Number: 5,130,832
[45] Date of Patent: Jul. 14, 1992

[54] DISPLAY DEVICE WITH LIGHT-SHIELDING HEAT RELEASER

[75] Inventors: Hisao Kawaguchi; Shigeo Nakabu, both of Nara, Japan

[73] Assignee: Sharp Kabushiki Kaisha, Japan

[21] Appl. No.: 531,763

[22] Filed: Jun. 1, 1990

[30] Foreign Application Priority Data

Jun. 7, 1989 [JP] Japan ................... 1-145623

[51] Int. Cl.[5] ............................................. G02F 1/13
[52] U.S. Cl. .......................................... 359/87; 359/62; 359/88
[58] Field of Search ............... 350/332, 334, 339 R, 350/331 R; 359/67, 70, 87, 88, 62

[56] References Cited

U.S. PATENT DOCUMENTS

| | | | |
|---|---|---|---|
| 3,825,803 | 7/1974 | Budde | 317/234 R |
| 4,127,321 | 11/1978 | Koyama et al. | 350/336 |
| 4,643,526 | 2/1987 | Watanabe et al. | 350/332 |
| 4,687,300 | 8/1987 | Kubo et al. | 350/334 |
| 4,810,061 | 3/1989 | Nakanowatari et al. | 350/334 |
| 4,826,297 | 5/1989 | Kubo et al. | 350/331 R |
| 4,917,466 | 4/1990 | Nakamura et al. | 350/336 |

FOREIGN PATENT DOCUMENTS

| | | | |
|---|---|---|---|
| 0167033 | 8/1986 | European Pat. Off. | |
| 0247893 | 12/1987 | European Pat. Off. | |
| 3025784 | 2/1982 | Fed. Rep. of Germany | |
| 2179103 | 11/1973 | France | |
| 0086031 | 5/1984 | Japan | 350/332 |
| 0130721 | 7/1985 | Japan | 350/332 |
| 0300224 | 12/1988 | Japan | 350/332 |

OTHER PUBLICATIONS

IBM Technical Disclosure Bulletin, vol. 15, No. 1, Jun. 1972, p. 308, Honn, "Eighty-Pin Package for Field-Effect Transistor Chips".
IBM Technical Disclosure Bulletin, vol. 30, No. 7, Dec. 1987, p. 49, "Low Thermal Resistance Package Design for Semiconductor Devices".

*Primary Examiner*—Rolf Hille
*Assistant Examiner*—Tan Ho
*Attorney, Agent, or Firm*—Nixon & Vanderhye

[57] ABSTRACT

A display device that includes a substrate, a display means disposed on the substrate, a driving circuit arranged along the periphery of the substrate, wherein the driving circuit is covered with a light-shielding heat releaser on the surface thereof in opposition to the substrate.

9 Claims, 3 Drawing Sheets

DISPLAY DEVICE WITH LIGHT-SHIELDING HEAT RELEASER

BACKGROUND OF THE INVENTION

1. Field of the invention

The present invention relates generally to a display device such as a thin-film transistor (TFT) liquid crystal display device, and more particularly to a device for protecting a display device against the detrimental build-up of heat and the irradiation of light.

2. Description of the prior art

In recent years liquid crystal display devices of an active matrix type, which has thin-film transistors (TFT) with pixels of liquid crystal have become popular. This type of display device exhibits a higher gradation than a duty-drive type liquid crystal display, and the resulting image quality is almost equal to that reproduced by conventional CRT displays. When the image quality is the same, the active matrix crystal display is more advantageous than the conventional CRT displays in that the thickness and size of the active matrix crystal display devices can be easily reduced, thus saving electricity. These merits stimulate the industry's interest in the active matrix crystal display device.

Referring to FIG. 7, a typical example of the IC drivers used in the conventional TFT display devices will be described:

An IC driver 2 is supported by a tape carrier 1 which is coupled by an anisotropic conductive film (not shown) to the terminal electrodes of a liquid crystal panel 3.

This arrangement is not applicable to a high precision display device having a liquid crystal panel 3 which requires terminal electrodes to be arranged with pitches of 100 μm or less, because of the difficulty of accurately arranging the terminal electrodes of the tape carrier 1, and the low resolution of the anisotropic conductive film.

FIG. 8 shows an improved display device which has a liquid display section having substrates 12, and 13 with a liquid crystal 11 interposed therebetween. The substrate 12 includes wiring electrodes 14 disposed on an edge area thereof on which a IC driver 15 is provided by the Chip-on-Glass System (COG System). Electric welding is carried out by wire bonding or alternatively soldering, each of which requires that the wiring is made of metal capable of wire bonding or having good affinity with solder. The selected material is costly, thereby increasing the production costs of liquid crystal display devices.

The wiring electrodes 14 are joined to the electrodes of the IC driver 15 with an electrically conductive adhesive. However, the build-up of heat in the display device impairs the constant resistivity of the joined electrodes, particularly at such a relatively high temperature such as when analog signals are treated. The build-up of heat also causes the malfunction of the IC driver 15.

The IC driver 15 includes a circuit as shown in FIG. 9. The image signal applied to a terminal 21 is stored in a sampling capacitor 23 in response to the input of a sampling pulse supplied to a gate transistor 22. When a transfer (TRF) signal applied to another gate transistor 24 is amplified to a higher level, the signal stored in the sampling capacitor 23 is transferred to a hold capacitor 25, and then is delivered to a signal electrode through an output circuit including a differential amplifier 26 and an output transistor 27.

In the circuit described above, when light is irradiated upon the IC driver 15, (1) the transistor 22 of the sampling pulse input section whose potential becomes high, and (2) the transistor 24 of the TRF signal input section becomes leaky owing to photo-electric effect. The leak causes a false display on the liquid crystal display device. The false display provides a problem particularly for liquid crystal display devices for projection TV where an intensified light is irradiated.

SUMMARY OF THE INVENTION

The display device of this invention, which overcomes the above-discussed and numerous other disadvantages and deficiencies of the prior art, comprises a substrate, a display means disposed on the substrate, a driving circuit arranged along the periphery of the substrate, wherein the driving circuit is covered with a light-shielding heat releaser on the surface thereof in opposition to the substrate.

In a preferred embodiment, the light-shielding heat releaser is a single layer to cover the entire surfaces of the driving circuit.

In another preferred embodiment, the display device further comprises a light-shielding member attached to the bottom surface portions of the substrate that correspond to the driver circuits.

According to another aspect of the invention, the display device comprises a smaller substrate and a larger substrate, a display means interposed between the two substrates, a driving circuit arranged on the rim portions of the larger substrate, a third substrate butt joined to the larger substrate, the third substrate carrying a control circuit thereon, and a light-shielding heat releaser extending from a bottom surface portion of the larger substrate that corresponds to the driving circuit up to the smaller substrate by way of the third substrate, the control circuit, and the driving circuit so that the driving circuit and the control circuit are enclosed with the light-shielding heat releaser, wherein the driving circuit keeps contact with the light-shielding heat releaser.

According to a further aspect of the present invention, the display device comprises a smaller substrate and a larger substrate, a display means interposed between the two substrates, a driving circuit arranged on the rim portions of the larger substrate, a third substrate butt joined to the larger substrate, the third substrate carrying a control circuit thereon, a light-shielding heat releaser extending from a bottom surface portion of the larger substrate that corresponds to the driving circuit up to the smaller substrate by way of the third substrate, and a case for enclosing a bottom surface portion of the larger substrate that corresponds to the driving circuit up to the smaller substrate by way of the third substrate, the driving circuit being covered with a light-shielding heat releaser electrically connected to the case.

In a preferred embodiment, the case comprises two halved portions one of which is fitted in the other.

In another preferred embodiment, the electrical connection between the light-shielding heat releaser and the case is effected by means of a spring of electrically conductive material.

In a further embodiment, the electrical connection between the light-shielding heat releaser and the case is effected by direct touch of a part of the heat releaser with the case.

In a preferred embodiment, the driving circuit comprises a sampling capacitor for applying a driving voltage to the liquid crystal, and a hold capacitor.

Thus, the invention described herein makes possible the objectives of (1) providing a display device having a high-precision large screen, capable of economical fabrication without the use of expensive components, (2) providing a display device safe from high temperatures generated in the driving elements because of the effective dissipation of heat by the heat releaser, and (3) providing a display device free from malfunction which would otherwise be caused by light, thereby enabling the display device to be used under the intensified light irradiation.

BRIEF DESCRIPTION OF THE DRAWINGS

This invention may be better understood and its numerous objects and advantages will become apparatus to those skilled in the art by reference to the accompanying drawings as follows.

DESCRIPTION OF THE PREFERRED EMBODIMENTS

Figure 1:
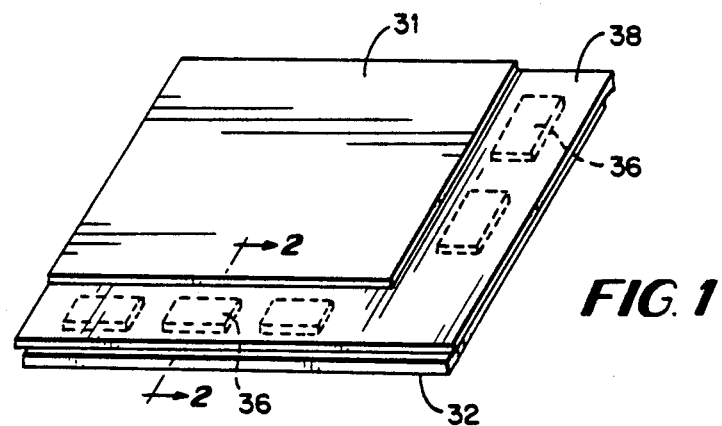
FIG. 1 is a perspective view showing a display device according to the present invention.
Figure 2:
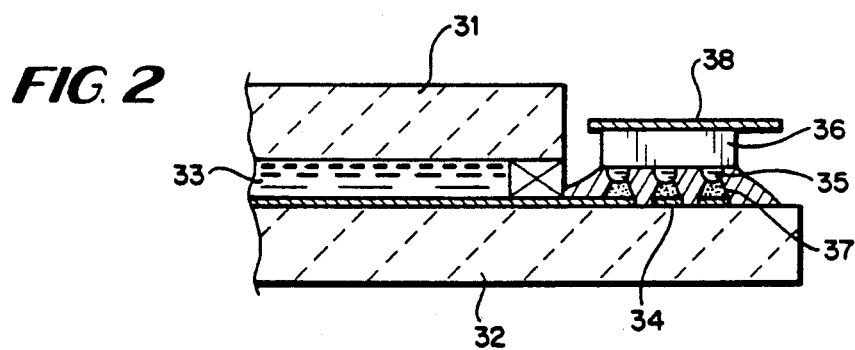
FIG. 2 is a cross-sectional view taken along the line II—II of FIG. 1.
Figure 9:
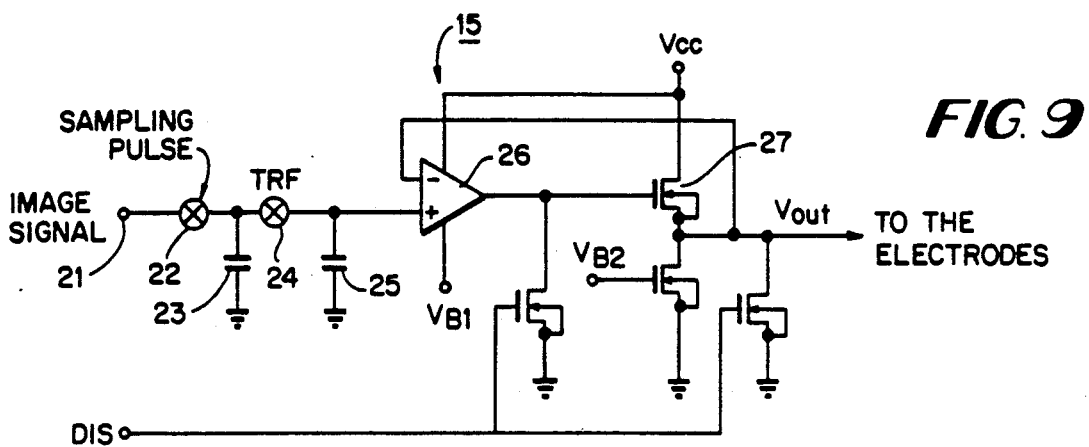
FIG. 9 is a circuit diagram showing a driver circuit included in a TFT liquid crystal display device.

Referring to FIGS. 1 and 2, which illustrates an example of the TFT liquid crystal display according to the present invention, the display includes a display section which comprises a smaller substrate 31 and a larger substrate 32 with a liquid crystal 33 sandwiched therebetween. The substrate 32 includes wiring electrodes 34 around the periphery thereof that has no portion of the smaller substrate 31 as shown in FIG. 2. The reference numeral 36 denotes an IC driver for activating a liquid crystal display panel. The IC drivers 36 include the liquid crystal driver circuit shown in FIG. 9, and are provided with projecting electrodes 35 joined to the wiring electrodes 34 with an adhesive 37 of electrically conductive material so as to effect an electrical connection between the IC drivers 36 and the wiring electrodes 34. In general, the sampling capacitor 23 and the hold capacitor 25, especially the latter, are likely to cause electrical leaks by exposure to light. Thus liquid crystal panels including such ICs must be shielded from exposure to light.

The feature of the present invention is that the substrate 32 and the light-shielding and heat-releasing member 38 are connected to each other by way of the IC driver 36. Hereinafter, the light-shielding and heat-releasing member 38 will be referred to merely as "light-shielding member". The light-shielding member 38 is made of a foil or a sheet which can shield light and is electrically conductive. For example, aluminum or copper foil can be used. In order to join the light-shielding member 38 to the opposite surface of the substrate 32 to the IC driver 36, a surface of the metal foil is coated with an adhesive, and the adhesive-coated surface is overlaid on the top surface of the IC drivers 36.

In the illustrated example a single light-shielding member 38 is used to cover all the IC drivers 36, especially to protect the sampling capacitor 23 and the hold capacitor 25 in the IC drivers against exposure to light, but a number of light-shielding members 38 corresponding to that of the IC drivers can be used to cover the IC drivers 36 individually.

The embodiment illustrated in FIGS. 1 and 2 releases heat directly from the IC drivers 36 into the atmosphere because of the direct joint between the heat releasing member 38 and the IC drivers 36. This favorable effect is obtainable if the adhesive is electrically conductive, thereby maintaining the reliability of connection resistance throughout in the entire display device. As a result, the wiring electrodes 34 (i.e. terminal electrodes) can be made of relatively cheap material, thereby reducing the production cost of the display device.

The light irradiated upon the top surfaces of the IC drivers 36 is interrupted by the light-shielding member 38, thereby avoiding the occurrence of leaks which would otherwise occur because of the irradiated light. Thus, sampling pulses corresponding to an image signal supplied to the input terminal 21 are sure to be applied to the liquid crystal layer 33, thereby displaying images without the interruptions of noise and error.

Figure 3:
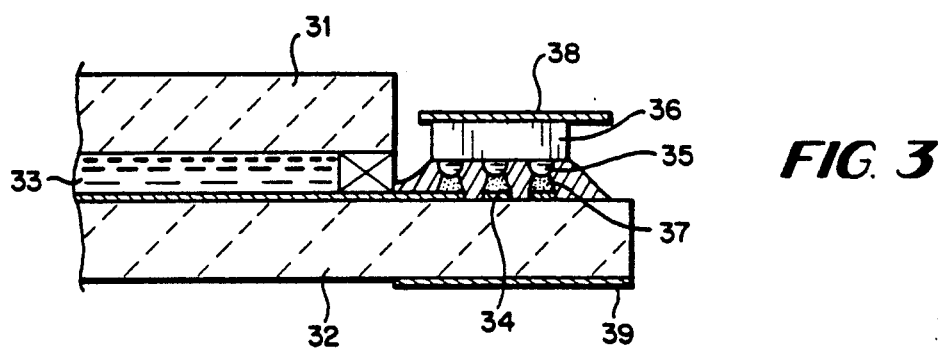
FIGS. 3 to 6 are cross-sectional views each showing examples of the display devices according to the present invention.

Referring to FIG. 3, another example will be described, in which like reference numerals denote like elements and components to those in FIGS. 1 and 2, and their description will be omitted for simplicity:

This example is different from the one described above with reference to FIGS. 1 and 2, in that a light-shielding tape 39 is adhered to the bottom surface of the substrate 32. More specifically, the tapes 39 are bonded to those areas which correspond to the IC drivers 36. The tape 39 protects the IC drivers 36 against light passing through the substrate 32 which often happens when a high voltage source such as that used for projecting TV systems is used. In this way, this example can reduce the possibility of leaks owing to the photoelectric effect. The tape 39 can be made of the same material for the light-shielding member 38 or may be made of a different material. It is also possible that the light-shielding member 38 and the tape 39 are connected to each other at one side of the substrate 32.

Figure 4:
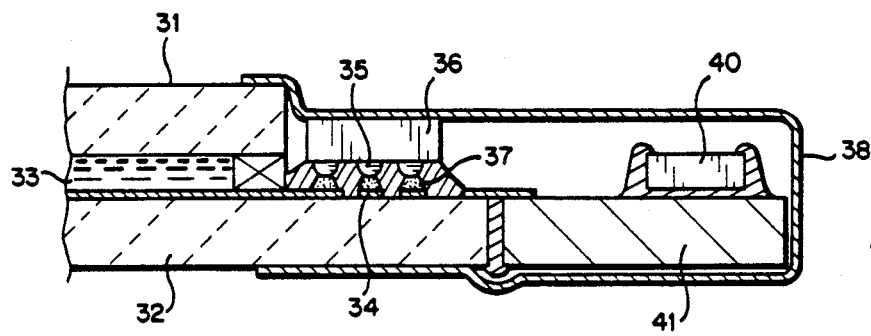

FIG. 4 shows a further example, which is characterized in that another substrate 41 is butt joined to the substrate 32 so as to constitute an integer, in that IC controllers 40 are disposed on the second substrate 41, the IC controllers 41 having control circuits. The light-shielding member 38 extends from a part of the bottom surface of the substrate 32 through the whole bottom surface of the substrate 41 and the IC drivers 36, and reaches a part of the top surface of the substrate 31. In this way, the light-shielding member 38 covers the IC drivers 36 and the IC controllers 40.

When the light-shielding member 38 is made of an electrically conductive material, the member 38 shields electro-magnetism. This example has advantages in that it protects the IC drivers 36 against light passing through the substrate 32, and also light irradiated from the backs of the IC drivers 36.

Figure 5:
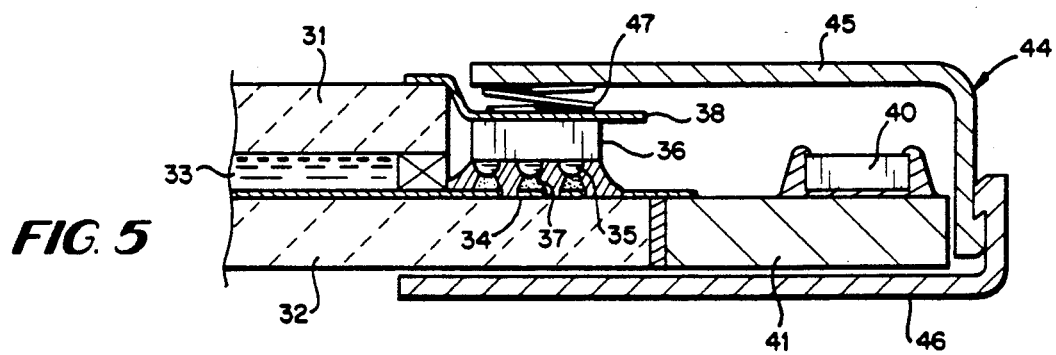

FIG. 5 shows a still further example, which is also provided with the substrate 41 butt joined to the substrate 32. The second substrate 41 carries the IC controllers 40. This example is characterized in that the IC drivers 36 and the IC controllers 40 are encased in a shield case 44 of tin plate or stainless steel plate which comprises an upper halved member 45 fitted in a lower halved member 46. The upper halved member 45 is connected to the light-shielding member 38 by means of a spring 47 of electrically conductive metal so that the case 44 is electrically connected to the light-shielding member 38. The spring 47 is also effective to press the light-shielding member 38 against the IC drivers 36 so as to place the light-shielding member 38 into close contact with the IC drivers 36, thereby eliminating the necessity of using adhesive. The non-use of adhesive facilitates the replacement of any deficient IC driver 36 by a fresh one. In addition, the electrical connection of the spring 47 to the case 44 strengthens the protection of the IC drivers 36 and the IC controllers 40 against electro-magnetism.

Figure 6:
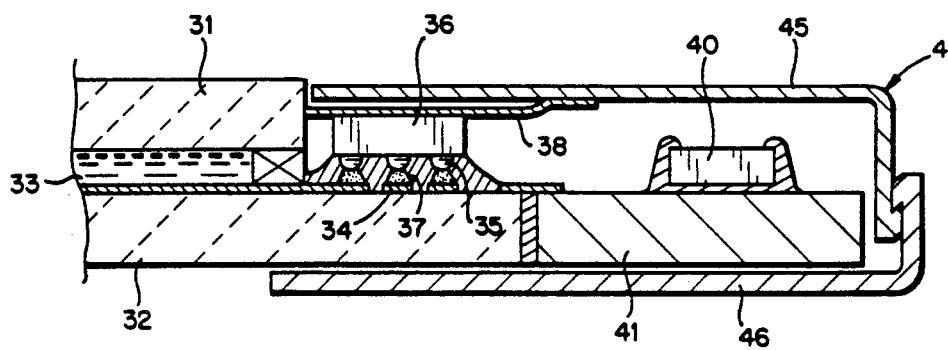
Figure 7:
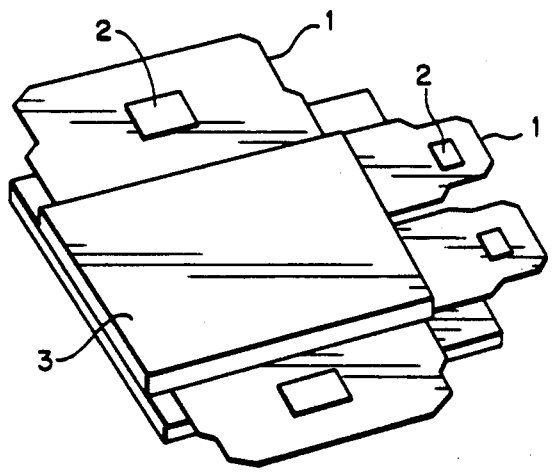
FIG. 7 is a perspective view showing a prior art liquid crystal display device employing a taper carrier.
Figure 8:
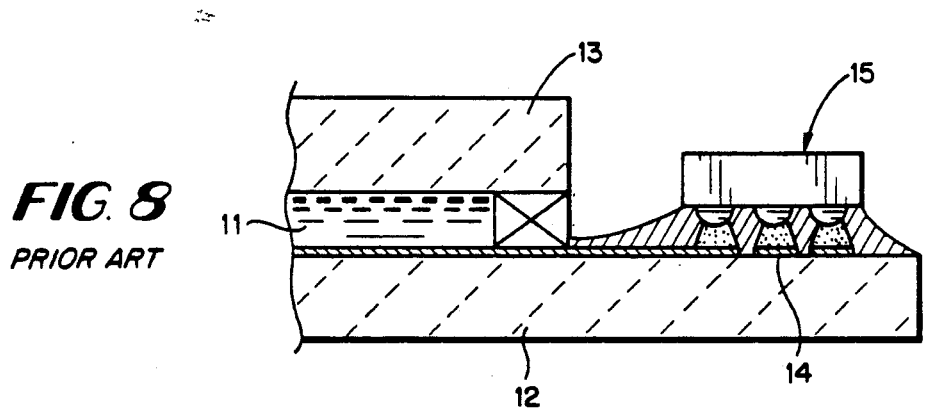
FIG. 8 is a cross-sectional view showing another prior art display device employing a COG system.

FIG. 6 shows a modification to the example illustrated in FIG. 5, from which this modified version is different in that the spring 47 is not used; more specifically, instead of using the spring 47, the light-shielding member 38 is bonded to the top surfaces of the IC drivers 36 with its inner end portion attached to the inside surface of the case 44. The IC driver 36 includes many heat-generating elements such as transistors, and as the operation continues, the generated heat builds up, thereby causing malfunction of the IC drivers. Advantageously, the light-shielding member 38 and the case 44 can dissipate heat generated by the IC driver 36.

The illustrated embodiments are examples obtained which the present invention is applied to TFT liquid crystal display devices, but the present invention can be of course applied to duty-type liquid crystal display devices, electro-luminescence display devices and plasma display devices. The present invention is particularly adapted for display devices using driving elements requiring a large capacitance and large volumes of electric power.

It is understood that various other modifications will be apparent to and can be readily made by those skilled in the art without departing from the scope and spirit of this invention. Accordingly, it is not intended that the scope of the claims appended hereto be limited to the claims be construed as encompassing all the features of patentable novelty that reside in the present invention, including all features that would be treated as equivalents thereof by those skilled in the art to which this invention pertains.

What is claimed is:

1. A display device comprising,
first and second substrates,
a liquid crystal sandwiched between the first and second substrates,
a driving circuit arranged along the periphery of the first substrate,
wherein the driving circuit is covered with a metal light-shielding heat releaser on a surface thereof facing the second substrate.

2. A display device comprising:
first and second substrates;
a liquid crystal sandwiched between the first and second substrate;
a driving circuit arranged along the periphery of the first substrate;
wherein the driving circuit is covered with a light-shielding heat releaser on a surface thereof facing the second substrate; and
wherein the light-shielding heat releaser is a single layer covering both surfaces of the driving circuit.

3. A display device comprising:
first and second substrates;
a liquid crystal sandwiched between the first and second substrates;
a driving circuit arranged along the periphery of the first substrate;
wherein the driving circuit is covered with a light-shielding heat releaser on a surface thereof facing the second substrate; and
further comprising a light-shielding member attached to a bottom surface portion of the first substrate on which the driving circuit is mounted.

4. A display device comprising,
a smaller substrate and a larger substrate,
a liquid crystal sandwiched between the substrates,
a driving circuit arranged on the rim portions of the larger substrate,
a third substrate butt joined to the larger substrate, the third substrate carrying a control circuit thereon, and
a light-shielding heat releaser extending from a bottom surface portion of the larger substrate that corresponds to the driving circuit up to the smaller substrate by way of the third substrate, the control circuit, and the driving circuit so that the driving circuit and the control circuit are enclosed with the light-shielding heat releaser, wherein the driving circuit is in contact with the light-shielding heat releaser.

5. A display device comprising,
a smaller substrate and a larger substrate,
a liquid crystal sandwiched between the substrates,
a driving circuit arranged on the rim portions of the larger substrate,
a third substrate butt joined to the larger substrate, the third substrate carrying a control circuit thereon,
a light-shielding heat releaser extending from a bottom surface portion of the larger substrate that corresponds to the driving circuit up to the smaller substrate by way of the third substrate, and
a case for enclosing a bottom surface portion of the larger substrate that corresponds to the driving circuit up to the smaller substrate by way of the third substrate, the driving circuit being covered with a light-shielding heat releaser which is electrically connected to the case.

6. A display device according to claim 5, wherein the case comprises two halved portions one of which is fitted in the other.

7. A display device according to claim 5, wherein the electrical connection between the light-shielding heat releaser and the case is effected by means of a spring of electrically conductive material.

8. A display device according to claim 5, wherein the electrical connection between the light-shielding heat releaser and the case is effected by direct touch of a part of the heat releaser with the case.

9. A display device according to claim 5, wherein the the driving circuit comprises a sampling capacitor for applying a driving voltage to the liquid crystal, and a hold capacitor.

* * * * *